United States Patent
Stimpson et al.

(10) Patent No.: US 6,643,562 B2
(45) Date of Patent: Nov. 4, 2003

(54) POSITION DETERMINING APPARATUS FOR COORDINATE MACHINE

(75) Inventors: Victor G Stimpson, Avening (GB); Jonathan P Fuge, Bristol (GB); David J Rogers, Dursley (GB)

(73) Assignee: Renishaw PLC, Gloucestershire (GB)

( * ) Notice: Subject to any disclaimer, the term of this patent is extended or adjusted under 35 U.S.C. 154(b) by 95 days.

(21) Appl. No.: 09/936,207
(22) PCT Filed: Jan. 26, 2001
(86) PCT No.: PCT/GB01/00294
§ 371 (c)(1), (2), (4) Date: Sep. 10, 2001
(87) PCT Pub. No.: WO01/55670
PCT Pub. Date: Aug. 2, 2001

(65) Prior Publication Data
US 2003/0060919 A1 Mar. 27, 2003

(30) Foreign Application Priority Data
Jan. 29, 2000 (GB) .............................. 0001961

(51) Int. Cl.⁷ .............................................. G06F 19/00
(52) U.S. Cl. ........................................ 700/195; 700/175
(58) Field of Search ................................ 700/174, 175, 700/186, 195

(56) References Cited

U.S. PATENT DOCUMENTS

| 4,518,257 A | | 5/1985 | Donaldson | |
|---|---|---|---|---|
| 5,101,495 A | * | 3/1992 | Yukawa | 710/104 |
| 5,329,458 A | * | 7/1994 | Unno et al. | 700/195 |
| 5,428,548 A | * | 6/1995 | Pilborough et al. | 700/195 |

FOREIGN PATENT DOCUMENTS

| DE | 42 38 504 C2 | 4/1996 |
|---|---|---|
| DE | 42 44 869 C2 | 8/1997 |
| EP | 0 098 930 A2 | 1/1984 |
| EP | 0 275 428 A2 | 7/1988 |
| EP | WO 88/06714 | 9/1988 |
| EP | 1 050 368 A1 | 11/2000 |
| FR | 2 343 555 | 10/1977 |
| WO | WO 93/23820 | 11/1993 |

* cited by examiner

*Primary Examiner*—Leo Picard
*Assistant Examiner*—Ryan Jarrett
(74) *Attorney, Agent, or Firm*—Oliff & Berridge, PLC

(57) ABSTRACT

A programmable device which produces a plurality of outputs is connected to a controller having less input ports than there are outputs to be received by the controller. To overcome this problem the controller is programmed to send different signals to the device, one at a time, upon receipt of a particular one of which, the device sends back a corresponding one of its outputs. In the specific example described the signals are different sequences of timing pulses.

5 Claims, 2 Drawing Sheets

POSITION DETERMINING APPARATUS FOR COORDINATE MACHINE

The present invention relates to an apparatus which enables a coordinate positioning machine (such as a machine tool) to determine the position of an object relative to a reference point. It may, for example, be employed on a machine tool for toolsetting operations.

A known tool setting device for use on a machine tool includes a light source which generates a fine beam of light which is incident upon a detector. During a toolsetting operation, the machine is operated to move the tool in a direction transverse to the direction of propagation of the light beam until a part of the tool interrupts passage of the light beam. Detection of this interruption results in the generation of a trigger signal in the detecting unit, which is used by the machine to establish the relative position of its moving parts in order to determine dimensions of the tool. Such devices are known, for example, from German Patent Nos. DE 42 385 04 and DE 42 448 69, French Patent No. 2,343,555, European Patent No. 98,930 and U.S. Pat. No. 4,518,257.

The devices disclosed in the above-mentioned patent specifications use a narrow light beam into or through which the tool is passed. The detection units detect when the tool breaks into the beam from the resulting drop in the intensity of the light falling on them.

The devices may be used additionally for measuring the length or diameter of a tool to monitor tool breakage or wear.

This additional functionality is produced by providing a plurality of outputs from the device which are individually connected to the input ports of the machine controller.

A problem arises however, with some controllers which have insufficient input ports for receiving all of the outputs. This has hitherto prevented the retrofitting of such multi-function devices to such controllers without losing much of the functionality.

An object of the present invention is to overcome this problem and to provide a device which is retrofittable to a controller with less input ports than there are outputs from the device, even a controller with only one input port, while preserving all of the functionality of the device.

According to the present invention there is provided a measuring system for a machine tool having a controller, wherein the measuring system includes a programmable device which produces a plurality of different output signals, and the controller has less input ports for receiving output signals from the programmable device than the number of output signals produced by the programmable device, and further wherein the controller is programmed to produce a plurality of signals to be sent selectively to the programmable device of the measuring system as input signals, said programmable device being responsive to the receipt of a particular input signal to connect a corresponding one of the output signals to the input of the controller.

Figure 1:
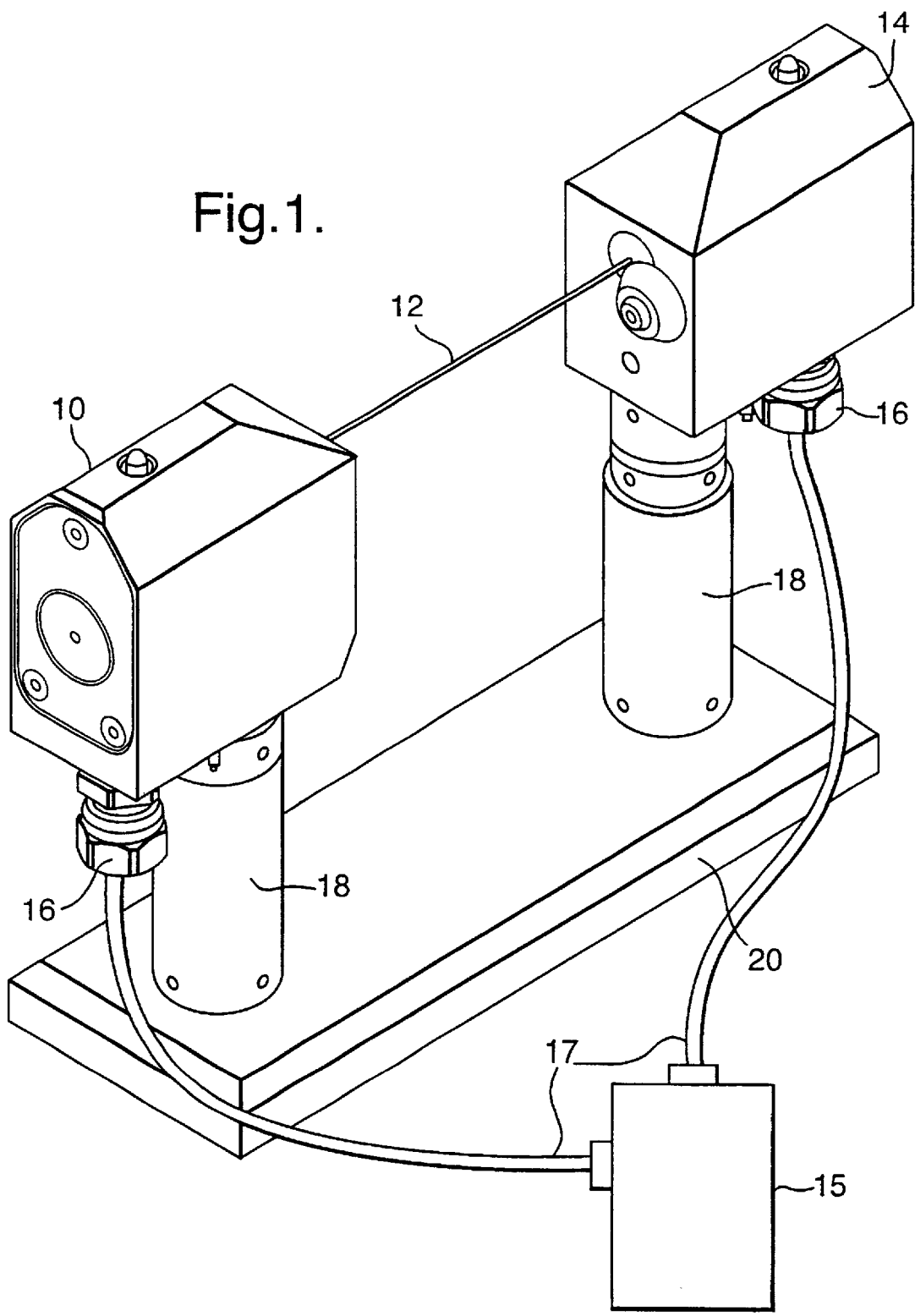
Figure 2A:
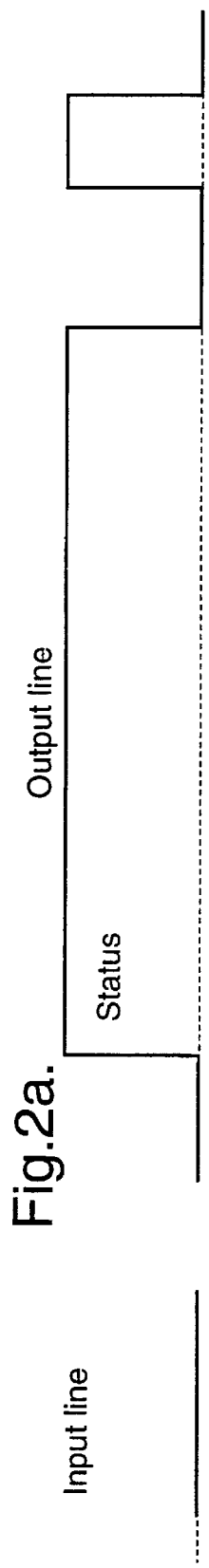
Figure 2B:
Figure 2C:
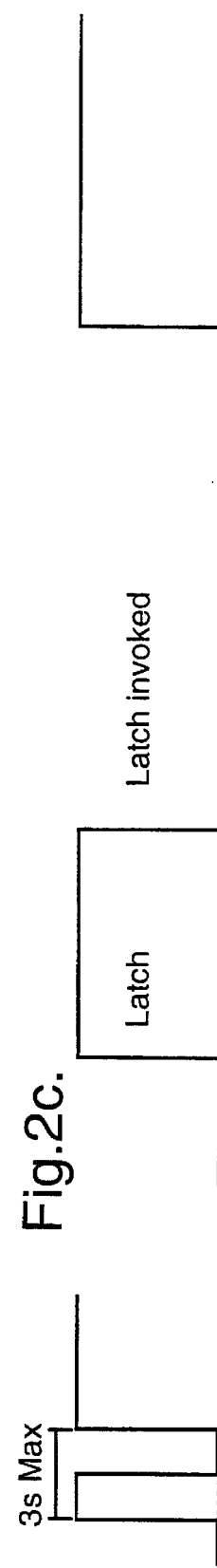
Figure 2D:

Examples of the invention will now be more particularly described with reference to the accompanying drawings in which:

FIG. 1 is a perspective view of an optical toolsetting device of one embodiment of the present invention; and FIGS. 2a to 2d show the input signals to, and the output signals from, the programmable device of the toolsetting device of FIG. 1.

Referring now to FIG. 1, a toolsetting apparatus which is suitable for use on, for example, a machine tool includes a light emitting unit 10 which emits a beam 12 of light, and a light detecting unit 14, where the light beam 12 is detected. Power and signal control cables 17 from a machine controller 15 to the light emitting and detecting units 10, 14 are routed via inlet ports 16, and both the units 10, 14 are advantageously mounted, via pillars 18, on the base of the machine, either via an intermediate base 20, to which they are both mounted, or directly to the base of the machine upon which they are to be employed.

In operation, the machine on which the device is mounted is commanded by the controller to move the tool in a direction transverse to the direction in which the beam 12 is propagating. When a predetermined level of occlusion of the beam has been established, the detecting unit 14 emits a trigger signal which is used by the machine to determine the relative position of its relatively movable parts, thereby to enable various features of the tool to be determined.

For further mechanical and electrical details of the device, reference is made to our European Patent Application No. 1050368A1.

The threshold level of the detecting unit 14 is set by a threshold detector to provide a trigger signal when the intensity of the light falling on it drops to fifty percent of the unobstructed light level.

In order to provide a number of functions which the device can perform, the trigger signal from the detector is passed to a programmable device, for example, a microprocessor, which, upon receipt of the trigger signal generates a plurality of output signals (in this example four) to be sent to the machine controller 15.

The four outputs are:

1. Status output (see FIG. 2a)—indicates whether or not the beam intensity is above or below the fifty percent level. This output goes high when the beam intensity falls below the fifty percent level, indicating that a trigger signal has been produced, and reverts to low when the beam is restored. In order to ensure that the controller responds to the very first trigger signal, however short, the status output remains high for a minimum period, for example 100 ms. A very short signal can arise, for example when the tool is rotating and a tooth first cuts into the beam for a very short period.
2. Inverted Status (see FIG. 2b)—goes low when the status output is high, and high when the status output is low.
3. Latch output (see FIG. 2c)—is low when selected and goes high when the status output goes from high to low, i.e. when the beam becomes unblocked after having been blocked. This output remains high whatever happens subsequently to the status output.
4. Skip output (see FIG. 2d)—goes high for a predetermined time on any change in the status output and then reverts to low, essentially sending a pulse of predetermined duration to the controller. Hence this output can also be used to obtain a trigger signal both when the tool first breaks the beam and when the beam is restored.

Various types of movement commands may be used by the controller to direct the machine to perform specific movements. One useful command, which is referred to as a G31 command is used in the tool measurement mode of the machine. This command instructs the machine to move in a straight line to a given point. If a trigger signal is received during the move, sending the output high, the position of the machine is recorded and the machine stops. Thus if the output is already high when a G31 command is issued, the machine simply reports its position and does not move.

The combination of the movement command codes and a particular output enables various ones of the following functional options to be used.

In order to measure tool diameter, the tool is driven towards the beam and a trigger signal is obtained when the beam is broken, as the tool enters the beam. The status output remains high once the trigger signal is received so when this output is selected the machine will not move when the next G31 command is issued from the controller.

Switching to the inverted status output line where the output is low enables the machine to start another move with a G31 command to obtain a second trigger signal when the beam tool exits the beam.

The latch output is used for a variety of functions. When this output is selected the machine is not stopped when a trigger signal is produced, but once triggered the output remains high.

One function of this mode is high-speed tool breakage detection. The machine is commanded to drive the tool through the beam on its way back to the tool storage device after use. This move is undertaken at high speed. If the tool is not broken it will break the beam, and a trigger signal occurs sending the latch output high. The tool is stopped near the tool storage device and the controller instructs the machine to perform a small G31 move. If the machine does not move it means that the latch output has gone high and that the tool broke the beam. If the machine completes its move it means that the tool did not break the beam and is damaged.

A tooth profile check can also be carried using this output. The tool is moved by the machine until it just breaks the beam. The machine is commanded to move the tool in a move corresponding to the tool profile, keeping the beam shining on the edge of the tool. If at any point the beam breaks through to produce a trigger signal, the latch output goes high, and indicates that a piece is missing from the tooth profile. Again a short G31 move can be commanded at the end of the profile move, and if the machine does not move this indicates that the latch output has gone high and the tool has been damaged. When retrofitting the toolsetting device to a variety of machines it sometimes happens that the controller has only one input port for receiving the outputs of measuring devices. Only one of the outputs from the device, usually the status output can be connected to such controllers.

The present invention circumvents this problem.

The controller has output connections to various components on the machine, including the device of the present invention, and is programmed to send appropriate instructions to these machine components to perform different movements.

The invention takes advantage of this by programming the controller to send different input signals to the device, and the microprocessor of the device is programmed to act on a specific input signal to select one of the outputs to be sent back to the controller.

In the present example, the inputs as shown in FIG. 2 are timed signals as follows:

Input 1. If the input signal goes low the status output is selected.

Input 2. If the input has been low for more than three seconds and then goes high, the inverted status output is selected.

Input 3. If the input has two rising edges, (i.e. goes high twice) in less than three seconds, the latch output is selected, and the timer in the microprocessor is reset.

Input 4. If the input has two rising edges in less than three seconds and then a further rising edge within another three seconds, the skip output is selected.

By this means the full functionality of the device as provided by its four outputs can be achieved even with a controller which has only a single input port to receive output signals from a measuring device.

What is claimed is:

1. A measuring system for a machine tool, comprising:
    a machine tool controller having at least one input port and having a controller timer; and
    a programmable measurement device having a measurement signal output receivable by the machine tool controller at the at least one input port,
    wherein the controller timer is operable to produce different timed sequences of signal for selective input to the device,
    wherein the device is operable to receive each signal input from the controller, and to vary its measurement signal output in response to the timing of that signal input, and
    wherein the number of measurement signal outputs of the device exceeds the number of input ports.

2. A measuring system as claimed in claim 1, wherein the function of the measurement device is changeable in response to the timing of the signal input to the device and the function of the measurement device varies the measurement signal output.

3. A measuring system as claimed in claim 1, wherein the measurement device comprises a toolsetting apparatus including a light emitting unit which emits a beam of light and a light detecting unit at which the light beam is detected.

4. A measuring system as claimed in claim 3, wherein the toolsetting apparatus has a plurality of modes of operation each selectable by a different signal input to the apparatus and each for causing the measurement output signal of the apparatus to vary.

5. A method of measuring on a machine tool having a machine tool controller including at least one input port and a timer;
    a programmable measurement device including a measurement signal output receivable by the machine tool controller at the at least one input port, and the number of measurement signal outputs of the device exceeding the number of input ports, the method comprising the steps, in any suitable order, of:
    operating the timer to produce different timed sequences of signal for selective input to the device;
    operating the device to receive each signal input from the controller; and
    operating the device so as to vary its measurement signal output in response to the timing of the signal input from the controller.

* * * * *